United States Patent Office 2,770,653
Patented Nov. 13, 1956

2,770,653

DIARALKYLALKYLENEDIAMINE PREPARATION

Roy S. Hanslick, Philadelphia, and Richard Bogash, Oreland, Pa., assignors to American Home Products Corporation, New York, N. Y., a corporation of Delaware No Drawing. Application March 9, 1955,
Serial No. 493,296

6 Claims. (Cl. 260—570.9)

This invention relates to a new process for the preparation of alkylene diamines and derivatives thereof.

In the preparation of di-substituted alkylene diamines by known procedures, one method involves reacting an unsubstituted alkylene diamine with an aldehyde or ketone in a suitable solvent to form a Schiff base. The latter is then hydrogenated by catalytic reduction or by a metal-alcohol or metal-acid combination. Such a procedure is described in the Szabo and Bruce Patent No. 2,627,491, dated February 3, 1953. The present invention is an improvement over this disclosed method since it avoids the costly and time-consuming reduction step as well as initial reaction costs because aldehyde is recovered as a secondary product of the process.

The improved procedure involves essentially a simple and easily controlled reaction of a Schiff base with an aromatic halide in the presence of an aliphatic alcohol of 2 to 8 carbon atoms, with n-butyl, n-amyl and n-hexyl alcohol being preferred, the latter being particularly effective.

The reaction may be illustrated as follows:

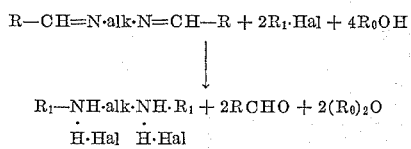

In the above formulae, R is intended to stand for an alkyl, aryl or heterocyclic radical, with $R_1$ representing an aralkyl radical while "alk" stands for an alkylene radical of 2 to 12 carbon atoms, the alkylene chain being either straight or branched-chain and "Hal" standing for a halogen atom, as chlorine, bromine or iodine. It is contemplated that the aromatic ring may have any substituent but it is preferred that the substituent be neither strongly oxidizing nor strongly acid where it is intended to use the final diamine products for the preparation of penicillin salts. Preferred substituents on a ring are alkyl, alkoxy, halogen, nitro, amino, oxo or hydroxy substituents.

The halid reactant is preferably a phenyl-lower alkyl halide. Specific preferred halides are benzyl chloride, alpha-methyl benzyl chloride, and beta-phenylethyl chloride.

The reaction temperature, which is the refluxing temperature of the solvent or liquid medium used, will range from about 75° to about 225° C. at atmospheric pressures with a preferred temperature in the range of about 120° to about 160° C.

It is noteworthy that the above described reaction goes best in the absence of water where an alcohol is used as in the present process. Although moisture does not detrimentally affect the process unduly, the presence of a material amount of water reduces the yield of desired product.

With regard to proportions of reactants, one should use an excess of halide over Schiff base, specifically, a ratio of halide to base of at least 2:1. The alcohol should be used in a ratio, alcohol to base, of at least 4:1, preferably in excess of this amount.

The following examples are illustrative of the invention.

Example 1

Freshly distilled benzyl chloride (63.3 gms.) (0.5 M) is added to magnesium sulfate dried and freshly distilled n-hexanol-1 (200 cc.) containing hot air dried and high vacuum dried N,N'-dibenzal-ethylenediamine (59.0 gms.) (0.25 M). The clear solution is refluxed with stirring for approximately five hours. Within a short time a crystalline white solid separates. Upon cooling the solution, the solid is filtered off, washed with ethanol and then with ether. The white solid is crystallized from water. The N,N'-dibenzyl-ethylenediamine dihydrochloride melts at 306–308° C. Its picrate: M. Pt. 212–213° C.

Example 2

Di - (p - methoxy-benzal)-ethylenediamine (29.6 gr.) (0.1 M) is dissolved in 125 cc. of n-hexyl alcohol to which is added benzyl chloride (25.2 gr.) (0.2 M). The clear solution is refluxed for three hours during which time a solid separates. The solution mixture is cooled and the solid filtered off, ethanol washed and finally ether washed. The product N,N'-dibenzyl-ethylenediamine dihydrochloride melts at 296° C. Its picrate melts at 212–214° C.

Example 3

Dibenzal-ethylenediamine (75 gr.) (0.237 M) is dissolved in 225 cc. of n-hexyl alcohol to which is added para-chlorobenzyl chloride (74 gr.) (0.474 M). The clear solution is refluxed for three hours during which time a solid separates. The solution mixture is cooled and the solid filtered off, ethanol washed and then ether washed. The product N,N'-di-(p-chlorobenzyl)-ethylenediamine dihydrochloride melts at 287–289° C.

Example 4

N,N' - di - n - butylidene-ethylenediamine (100.8 gr.) (0.6 M) is dissolved in 250 cc. of n-hexyl alcohol to which is added benzyl chloride (151.2 gr.) (1.2 M). The clear solution is refluxed for five hours during which time a solid separates. The solution mixture is cooled and the solid filtered off, alcohol washed and then washed with ether. The product N,N'-dibenzyl-ethylene diamine dihydrochloride melts at 294–296° C. The picrate of dibenzyl-ethylenediamine melts at 212–214° C.

Example 5

N,N'-dibenzal-ethylenediamine (23.6 gr.) (0.1 M) is dissolved in 100 cc. of absolute ethyl alcohol to which is added benzyl chloride (27.2 gr.) (0.2 M). The clear solution is refluxed until no further precipitate occurs. The solution mixture is cooled and the solid filtered off and washed with ether giving the product, N,N'-dibenzyl-ethylenediamine dihydrochloride.

Example 6

N,N'-difurfural-ethylenediamine (21.6 gr.) (0.1 M) is dissolved in 150 cc. n-hexyl alcohol to which is added benzyl chloride (25.3 gr.) (0.2 M) while nitrogen gas is bubbled into the solution. Heating to approximately 100° C. for 30 minutes, a solid separates which is filtered off. Upon further heating at 100° C. for one hour the N,N'-dibenzyl-ethylenediamine dihydrochloride is filtered off from the cooled mixture, washed with ethanol and then with ether. Its dipenicillin salt melts at 129° C.

Example 7

9-heptadecanone (25.4 gr.) (0.1 M) and ethylenediamine hydrate (3.9 gr.) (0.05 M) were heated together in a Carius tube at 150–155° C. for three hours. Twenty

(20) grams of a viscous product was obtained which could not be crystallized. This material was dissolved in n-hexyl alcohol (125 cc.) and heated to reflux. Benzyl chloride (18.0 gr.) (0.14 M) was added dropwise to the solution. After 20–25 minutes a white solid separated. Refluxing was continued for two hours; cooled and the N,N'-dibenzyl-ethylenediamine dihydrochloride filtered, acetone washed and dried.

The compounds produced in the inventive procedure are all useful for the isolation of penicillin and for purifying the latter by selective precipitation from a mixture of inert, non-acidic or weakly acidic impurities. Additionally, the compounds form substantially water-insoluble salts with penicillin which salts have important therapeutic uses. To form penicillin salts one may react the N,N'-disubstituted alkylene diamine with any of the known penicillins either as free base and pencillic acid, in an organic medium, or one may react a salt of the diamine with a salt of penicillin in an aqueous medium.

This application is a continuation-in-part of application Serial No. 418,212, filed March 23, 1954, now abandoned.

We claim:

1. The process comprising, reacting a diamine having the formula R—CH=N·alk·N=CH—R with a halide of the formula $R_1$·Hal in the presence of an alcohol of 2 to 8 carbon atoms, said reactants being in a molar ratio, diamine:halide:alcohol of at least 1:2:4, the reaction being carried out under substantially anhydrous conditions and at a temperature in the range of 75° to about 225° C., R in the above formulae standing for a member of the group consisting of alkyl of not more than 17 carbon atoms, phenyl, methoxyphenyl and furfuryl radicals, while $R_1$ represents a member of the group consisting of benzyl, alpha-methylbenzyl and beta-phenylethyl, "Hal" stands for a halogen of the group consisting of chloride, bromide and iodide and "alk" represents an alkylene group of 2 to 12 carbon atoms.

2. The process comprising, reacting a diamine having the formula R—CH=N·alk·N=CH—R with benzylchloride in the presence of an alcohol of 2 to 8 carbon atoms, said reactants being in a molar ratio, diamine:halide:alcohol of at least 1:2:4, the reaction being carried out under substantially anhydrous condtions and at a temperature in the range of 75° to about 225° C., R in the above formulae standing for a member of the group consisting of alkyl of not more than 17 carbon atoms, phenyl, methoxyphenyl and furfuryl radicals, while "alk" represents an alkylene radical of 2 to 12 carbon atoms.

3. The process of claim 2; wherein the alcohol is n-hexyl alcohol.

4. The process comprising reacting N,N'-dibenzal-ethylenediamine with bezyl chloride and n-hexyl alcohol under substantially anhydrous conditions and at the refluxing temperature of the alcohol, the molar proportions of diamine:halide:alcohol being at least 1:2:4.

5. The process of claim 4; wherein alpha-methylbenzyl chloride is used instead of benzyl chloride.

6. The process of claim 4; wherein beta-phenylethyl chloride is used instead of benzyl chloride.

References Cited in the file of this patent

UNITED STATES PATENTS 2,387,873     Boon et al.  ---------------- Oct. 30, 1945

OTHER REFERENCES

Decker et al.: "Liebigs Annalen," vol. 395 (1913), pp. 362–77.